(12) United States Patent
Assani

(10) Patent No.: US 10,721,443 B1
(45) Date of Patent: Jul. 21, 2020

(54) INTERACTIVE DOOR ASSEMBLY SYSTEM AND METHOD

(71) Applicant: Joie Aganze Assani, Arlington, TX (US)

(72) Inventor: Joie Aganze Assani, Arlington, TX (US)

( * ) Notice: Subject to any disclaimer, the term of this patent is extended or adjusted under 35 U.S.C. 154(b) by 0 days.

(21) Appl. No.: 16/427,205

(22) Filed: May 30, 2019

(51) Int. Cl.
| | | |
|---|---|---|
| G05B 19/00 | (2006.01) | |
| G05B 23/00 | (2006.01) | |
| G06F 7/00 | (2006.01) | |
| G06F 7/04 | (2006.01) | |
| G06K 19/00 | (2006.01) | |
| G08B 29/00 | (2006.01) | |
| G06C 19/00 | (2006.01) | |
| H04B 1/00 | (2006.01) | |
| H04B 3/00 | (2006.01) | |
| H04Q 1/00 | (2006.01) | |
| H04Q 9/00 | (2006.01) | |
| H04N 7/18 | (2006.01) | |
| G07C 9/00 | (2020.01) | |
| H04N 5/247 | (2006.01) | |
| G06K 9/00 | (2006.01) | |
| E06B 7/28 | (2006.01) | |

(52) U.S. Cl.
CPC ............ *H04N 7/186* (2013.01); *E06B 7/28* (2013.01); *G06K 9/00885* (2013.01); *G07C 9/00182* (2013.01); *H04N 5/247* (2013.01); *E05Y 2900/132* (2013.01)

(58) Field of Classification Search
CPC .......... H04N 7/186; H04N 5/247; E06B 7/28; G06K 9/00885; G07C 9/00182; E05Y 2900/132
See application file for complete search history.

(56) References Cited

U.S. PATENT DOCUMENTS

| | | | | |
|---|---|---|---|---|
| 5,525,875 A | * | 6/1996 | Nakamura | E05B 81/20 318/266 |
| 6,429,893 B1 | * | 8/2002 | Xin | G08B 13/19632 348/155 |
| 6,898,299 B1 | * | 5/2005 | Brooks | G07C 9/37 382/115 |
| 7,088,252 B2 | * | 8/2006 | Weekes | G08B 21/0286 340/572.1 |
| 7,412,081 B2 | * | 8/2008 | Doi | G06F 21/32 382/115 |
| 7,583,191 B2 | * | 9/2009 | Zinser | G08B 13/196 340/539.1 |
| 7,929,951 B2 | * | 4/2011 | Stevens | G06F 21/32 455/414.1 |

(Continued)

*Primary Examiner* — Quang Pham
(74) *Attorney, Agent, or Firm* — Law Office of Jeff Williams PLLC; J. Oliver Williams

(57) ABSTRACT

Embodiments of the present invention provides a system and method of a smart door. The system includes a camera, a display interface, and an internal rechargeable battery. In some embodiments, a camera and a display interface are mounted on both sides of the door, thus allowing users to communicate through the door while the door forms a physical barrier between the communicating users. The system networks multiple doors together. At least one door can track occupants location and entrance/exit within a structure. The system also provides the capability to give user wellness information and operate fully with biometrics

10 Claims, 5 Drawing Sheets

(56) References Cited

U.S. PATENT DOCUMENTS

| | | | | |
|---|---|---|---|---|
| 9,390,570 B1* | 7/2016 | Chen | ............ | G07C 9/00174 |
| 9,578,261 B1* | 2/2017 | Rockwell | ............ | H04N 5/2252 |
| 10,072,454 B1* | 9/2018 | Roosli | ............ | H04N 5/2253 |
| 2002/0067406 A1* | 6/2002 | Chen | ............ | H04N 7/186 |
| | | | | 348/61 |
| 2003/0095185 A1* | 5/2003 | Naifeh | ............ | H04N 7/185 |
| | | | | 348/156 |
| 2006/0152121 A1* | 7/2006 | Son | ............ | F25D 29/005 |
| | | | | 312/405 |
| 2008/0239072 A1* | 10/2008 | Cheng | ............ | G08B 13/19619 |
| | | | | 348/143 |
| 2009/0032010 A1* | 2/2009 | Hoffmeier | ............ | F24C 15/006 |
| | | | | 126/198 |
| 2009/0091618 A1* | 4/2009 | Anderson | ............ | H04N 7/183 |
| | | | | 348/143 |
| 2009/0217920 A1* | 9/2009 | Flesch | ............ | F24C 15/02 |
| | | | | 126/190 |
| 2010/0115853 A1* | 5/2010 | Gebhart | ............ | H02P 6/085 |
| | | | | 49/506 |
| 2011/0243545 A1* | 10/2011 | Mota | ............ | G03B 17/00 |
| | | | | 396/427 |
| 2011/0285501 A1* | 11/2011 | Chen | ............ | E05B 47/0012 |
| | | | | 340/5.7 |
| 2011/0292213 A1* | 12/2011 | Lacey | ............ | H04N 7/186 |
| | | | | 348/153 |
| 2012/0113253 A1* | 5/2012 | Slater | ............ | H04N 7/185 |
| | | | | 348/143 |
| 2013/0030552 A1* | 1/2013 | Beckley | ............ | G05B 19/0423 |
| | | | | 700/17 |
| 2013/0045763 A1* | 2/2013 | Ruiz | ............ | H04M 1/0291 |
| | | | | 455/466 |
| 2015/0124091 A1* | 5/2015 | Stahl | ............ | H04N 7/183 |
| | | | | 348/143 |
| 2015/0181169 A1* | 6/2015 | Kim | ............ | H04N 5/23293 |
| | | | | 348/143 |
| 2015/0330116 A1* | 11/2015 | Dente | ............ | B60L 58/25 |
| | | | | 307/10.1 |
| 2016/0088561 A1* | 3/2016 | Hirai | ............ | H04M 11/025 |
| | | | | 455/68 |
| 2016/0180618 A1* | 6/2016 | Ho | ............ | G07C 9/00563 |
| | | | | 340/5.52 |
| 2016/0247027 A1* | 8/2016 | Tsoi | ............ | H04N 5/2252 |
| 2017/0026555 A1* | 1/2017 | Hoyda | ............ | H04N 9/3141 |
| 2017/0236389 A1* | 8/2017 | Tang | ............ | B60Q 3/217 |
| | | | | 49/13 |
| 2017/0268716 A1* | 9/2017 | Hoyda | ............ | F16M 11/14 |
| 2017/0295357 A1* | 10/2017 | Yang | ............ | H04N 13/296 |
| 2018/0122261 A1* | 5/2018 | O'Kidhain | ............ | E04H 1/125 |
| 2018/0234668 A1* | 8/2018 | Bauswell | ............ | H04N 5/232 |
| 2019/0131805 A1* | 5/2019 | Rush | ............ | H01M 2/1077 |
| 2019/0221144 A1* | 7/2019 | Artwohl | ............ | G09F 23/06 |
| 2019/0311451 A1* | 10/2019 | Laycock | ............ | G06K 9/00718 |

\* cited by examiner

INTERACTIVE DOOR ASSEMBLY SYSTEM AND METHOD

BACKGROUND

1. Field of the Invention

The present application relates to the field of smart devices, and more particularly to interactive door systems.

2. Description of Related Art

The pairing of doors with electronic systems have been developed into a variety of ways. Motorized sliding doors paired with a motion detection feature allow for the sliding door to open automatically upon detecting a user approaching the door. Smart refrigerators have touchscreen interfaces connected to a network that assist a user to manage food supplies, plan a meal based on stocked food supplies, and inform users of available food coupons at a local grocery store. Furthermore, smart refrigerators can also display a calendar that sync's with the calendars of a plurality of users within a household, display photos uploaded to a network shared with the smart refrigerator, display alert notifications, and even play music or television upon request. Cameras can also be paired with a door as well: commercially available devices that pair a camera with a doorbell and a motion sensor can send notifications to a mobile device of a homeowner that notify the homeowner when a guest has approached the door. Furthermore, said devices can collect video recording of the guest which is in turn transmitted to the mobile device of the homeowner, thus allowing the homeowner to identify the guest that is approaching the door. Doors can also be paired with smart locks wherein the smart lock is configured to unlock a door in response to detecting a device associated with a homeowner, such as a radio-frequency identification (RFID) device or an established wi-fi/ultra-high frequency (UHF) connection between the smart lock and a mobile device of the homeowner.

Although strides have been made to make doors more interactive for homeowners through detection, notification, and security protocols, some shortcoming remain. It is desired to improve the interaction between a homeowner and a smart door.

SUMMARY OF THE INVENTION

Embodiments of the present invention disclose a method and system for allowing two users to communicate with each other on opposing sides of a smart door while maintaining a physical barrier between the two users. In one embodiment of the present invention, a system is provided comprising: a first camera mounted on a first planar side of a door; a first display interface mounted on a second planar side of the door, wherein the first display interface displays video images of the first camera; and a rechargeable battery mounted internally within the door. Further embodiments include a second camera mounted on the second planar side of the door, and a second display interface mounted on the first planar side of the door, wherein the second display interface displays video images of the second camera.

An additional object of the present application is to provide a system with the capability to also give user wellness information and operate fully with biometrics.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions insofar as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
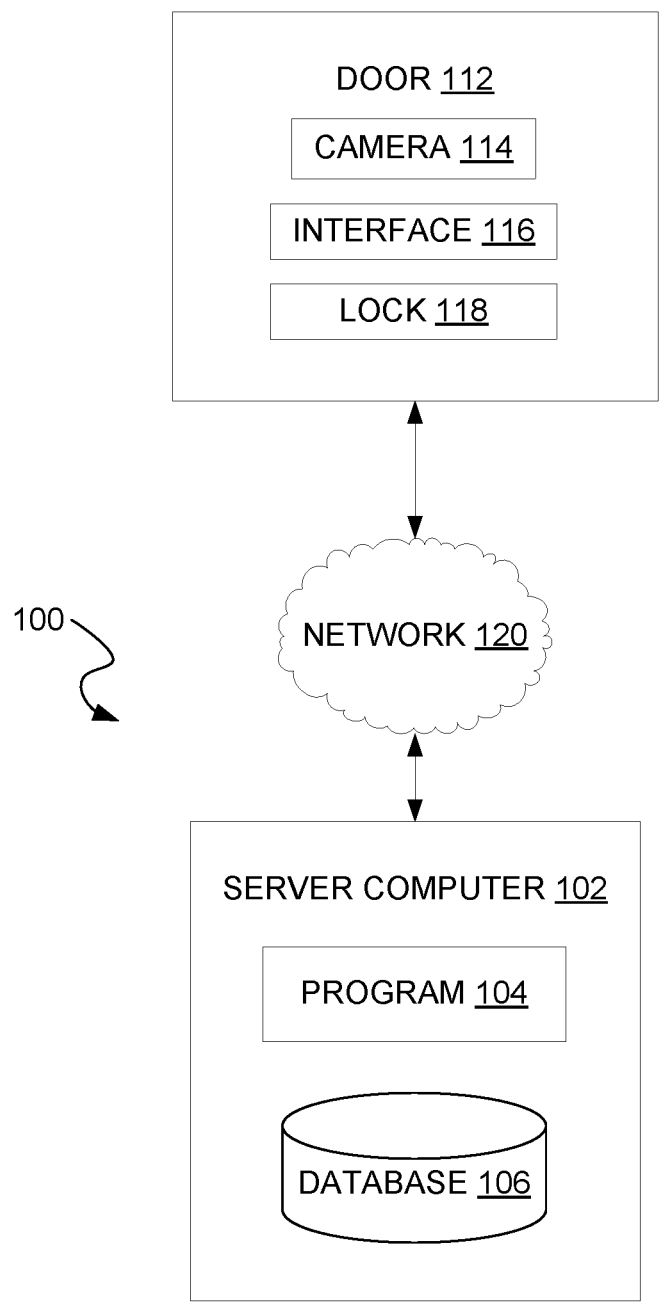
FIG. 1 is a functional block diagram illustrating a communication environment, in accordance with an embodiment of the present application.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

Embodiments of the present invention recognize that smart doors limit users to communicate using a single display. In particular, the system of the present invention is a smart door having a first interface on a first side of the door, a second interface on a second side of the door, and a set of cameras that correspond to the first interface and the second interface. This allows for a first user and a second user to observe and communicate with each other on opposing sides of the smart door while maintaining a safe physical barrier between the first user and the second user. As described in greater detail later in the specification, embodiments of the present invention also have additional security features that unlock the door in response to detecting security credentials of a user, and offers tracking of a set of persons wherein locations of the tracked set of persons are shown on a map that is displayed on an interface on the door.

Implementation of embodiments of the invention may take a variety of forms, and exemplary implementation details are discussed subsequently with reference to the figures. Several embodiments may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

FIG. 1 is a functional block diagram illustrating communication environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Communication environment 100 includes server computer 102 and door 112, all interconnected over Network 120. Server computer 102 and door 112 can be a standalone computing device, a management server, a webserver, a mobile computing device, or any other electronic device or computing system capable of receiving, sending, and processing data. In other embodiments, server computer 102 and door 112 can represent a server computing system utilizing multiple computers as a server system, such as in a cloud computing environment. In another embodiment, server computer 102 and door 112 can be a laptop computer, a tablet computer, a netbook computer, a personal computer (PC), a desktop computer, a personal digital assistant (PDA), a smart phone, or any programmable electronic device capable of communicating with various components and other computing devices (not shown) within communication environment 100. In another embodiment, server computer 102 and door 112 each represent a computing system utilizing clustered computers and components (e.g., database server computers, application server computers, etc.) that act as a single pool of seamless resources when accessed within communication environment 100. In some embodiments, sever computer 102 and door 112 are a single device. Server computer 102 and door 112 may include internal and external hardware components capable of executing machine-readable program instructions, as depicted and described in further detail with respect to FIG. 5.

Door 112 includes camera 114, interface 116, and lock 118. Camera 114 is a video camera and microphone capable of collecting video and audio. Interface 116 is a display interface and set of audio speakers capable of displaying video and playing audio collected by camera 114. In a further embodiment, interface 116 is a touch screen interface. Door 112 can have multiple instances of camera 114 and multiple instances of interface 116 wherein the multiple instances of interface 116 each display a camera feed corresponding to the multiple instances of camera 114. For example, a first interface displays camera feed corresponding to a first camera, and a second interface displays camera feed corresponding to a second camera. Lock 118 is an electromechanical locking mechanism capable of receiving signals from program 104, wherein the signals instruct lock 118 to lock or unlock. Lock 118 is a lock that secures door 112 to a doorframe.

Server computer 102 includes program 104 and database 104. In general, program 104 that executes functions and features associated with door 112. In one embodiment, program 104 collects video and audio signals from camera 114 and transmits the audio and video signals to interface 116. In a further embodiment, program 104 collects video and audio signals from camera 114 and stores the collected video and audio signals onto database 106. In one embodiment, program 104 can synchronize with an electronic calendar of a user via network 120. In this embodiment, program 104 displays a synchronized calendar and corresponding events of the user. In further embodiments, program 104 displays alerts, reminders, and alarms associated with corresponding events of the user. In even further embodiments, program 104 displays text messages corresponding to a mobile phone of a user, wherein program 104 is paired with the mobile phone such that in response to the mobile phone receiving a text message, program 104 displays the text message on interface 116. In another embodiment, in response to receiving no inputs from a user over a predetermined amount of time, program 104 displays a screen saver on interface 116.

In one embodiment, program 104 uses facial recognition to identify a user based on a collection of video signals collected from camera 114. In this embodiment, database 106 stores facial data corresponding to a user, wherein the user is registered to have permission to open door 112. Program 104 continuously collects video signals from camera 114 and performs facial recognition analysis on the collected video signal to determine whether the user is present in the video signals. In a further embodiment, if program 104 determines the user is present in the video signal, then program 104 transmits a signal to lock 118 to unlock door 112. If program 104 does not identify a user that is registered to have permission to open door 112, then program 104 transmits a signal to lock 118 to keep door 112 locked.

In an even further embodiment, in response to identifying a user registered to have permission to open door 112, program 104 displays a location of the user on a graphical map of a building housing door 112. For example, a first user approaches within the visual range of camera 114 on door 112, wherein door 112 is installed at a location in a house: program 104 collects video signal from camera 114, performs facial recognition analysis of the video signal, determines the first user is a registered user, and stores a location of the first user on database 106 based on the location of door 112 and the visual range of camera 114. Furthermore, when a second user uses a smart phone that is network connected to program 104, program 104 displays the location of the first user on a graphical map of the house on a display interface on the smart phone, thus informing the second user the location of the first user.

In another embodiment, program 104 collects audio and video signals from camera 114 and transmits the audio and video signals to a device (not shown) capable of playing the audio and video signals, wherein the device can be a network connected television or a network connected mobile phone.

Database 106 is a repository for data accessible by program 104. Database 106 can be implemented with any type of storage device capable of storing data and configuration files that can be accessed and utilized by server computer 102, such as a database server, a hard disk drive, or a flash memory. Database 106 stores profile data associated with a set of users that have permission to use door 112, wherein profile data associated with the set of users comprises baseline images of each user that program 104 uses to compare with collected video signals using facial recognition analysis to identify whether the collected video signals describes a user that has permission to use door 112.

Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, Network 120 can be any combination of connections and protocols that will support communications among server computer 102 and door 112, and other computing devices (not shown) within communication environment 100.

Figure 2:
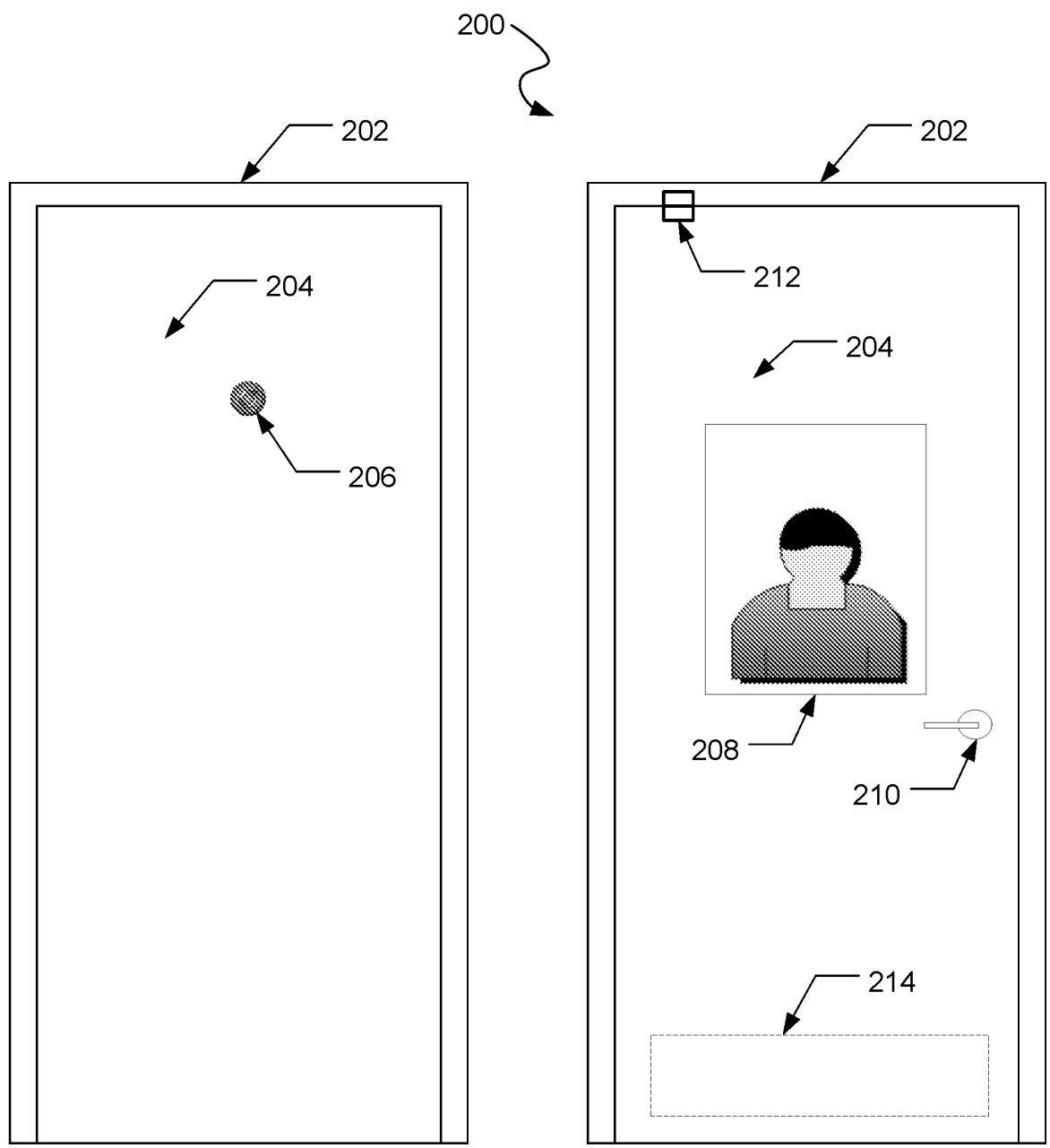
FIG. 2 is a one-way interface smart door, in accordance with an embodiment of the present invention.

FIG. 2 is an example embodiment 200 depicting front and back views of a one-way interface smart door, in accordance with an embodiment of the present invention.

In this embodiment, door 204 utilizes a single camera paired with a single interface. In FIG. 2, door 204 is mounted to fit correspondingly with door frame 202. As used herein, a "front side" is a planar side of a door that faces outward from an enclosed room or building. For example, to enter into a house having a door serving as a barrier from outside the house, a user approaches the front side of the door. As used herein, a "back side" is a planar side of a door that faces inward from an enclosed room or building. A back side is an opposing side relative to a front side. For example, to exit a house having a door serving as a barrier from outside the house, a user approaches the back side of the door. Camera 206 is mounted on a front side of door 204, and interface 208 is mounted on a back side of door 204. In this figure, a user stands in a field of view of camera 206. Program 104 collects audio and video signals from camera 206 and plays the collected audio and video signals through interface 208. In this example, the user is displayed on interface 208. It is understood that one or more sensors may be incorporated into camera 206 and/or door 204 to detect an obstruction over camera 206. The presence of an obstruction would be provided to the user via an alert or notice, such as on interface 208.

Interface 208 is a display interface wherein the display screen is planarly flush with the body of door 204. In some embodiments, interface 208 has integrated speakers that are capable of playing audio signals. In further embodiments, interface 208 have connection terminals that allow for a multiplicity of display interfaces. For example, door 204 has a first display interface. A user can connect a second display interface via connection terminals of the first interface such that the combination of the first display interface and the second display interface produce a continuous display across the first and second display interfaces.

Locking mechanism 210 is coupled with door 204 and serves as a locking mechanism for maintaining a closed state of door 204. As used herein, a closed state is when door 204 mates with door frame 202, and a lock corresponding to locking mechanism 210 is engaged with door frame 202. Conversely, an open state is when a lock corresponding to locking mechanism 210 is disengaged from door frame 202, thus allowing door 204 to pivot away from door frame 202 based on a corresponding set of door hinges that are coupled between door frame 202 and door 204. Various forms of locking mechanism 210 are contemplated. In this example, a door handle is paired with locking mechanism 210 such that when a user applies a torque to the door handle, locking mechanism 210 disengages a lock.

In an alternate embodiment locking mechanism 210 is an electromechanical lock paired with a near field sensor or a RFID sensor. In this embodiment, in response to detecting an RFID badge or a near field badge associated with a user having permission to open door 204 via a near field sensor or a RFID sensor, program 104 transmits instructions to lock 210 to disengage a lock that is securing door 204 to door frame 202. In an alternate embodiment, in response to identifying a user having permission to open door 204 based on facial recognition analysis of video signals collected from camera 206, program 104 transmits instructions to lock 210 to disengage a lock that is securing door 204 to door frame 202.

In a further embodiment, program 104 unlocks door 204 using a two-factor authorization, wherein a first factor is a sensor and badge system using near field or RFID technology as previously mentioned, and wherein a second factor is identifying the user as having permission to open door 204 based on facial recognition analysis of video signals collected from camera 206.

In one embodiment, door 204 has locking mechanism 210, wherein locking mechanism 210 comprises a lock and a pair of respective door handles, wherein each handle of the pair of door handles is mounted respectively on a front side and back side of door 204. In an alternate embodiment, locking mechanism 210 comprises a lock and a single door handle mounted on the back side of door 204 (as shown in FIG. 2). In this embodiment, a first user standing on the back side of door 204 can unlock door 204 using the corresponding door handle, but a second user standing on the first side of door 204 can only unlock door 204 only upon program 104 determining the second user has permission to open door 204 through facial recognition analysis via camera 206, a near field or RFID badge, or a combination of the two as a two-factor authorization. Upon program 104 determining the second user has permission to open door 204, program 104 transmits instructions to locking mechanism 210 to disengage a lock, thus allowing the second user to press on door 204 and therefore opening the door for entry.

In a further embodiment, locking mechanism 210 is paired with a push-button interface mounted on a front side and/or backside of door 204. In this embodiment, push-button interface comprises a plurality of push-buttons that, in response to a user pressing the push buttons in a predetermined order, unlocks locking mechanism 210.

In another further embodiment, door handles associated with locking mechanism 210 are electrode handles that, upon a user grabbing and holding the electrode handle, program 104 collects electrode signals that describe biometrics of the user. Biometrics of the user include, but is not limited to, a heart rate of the user and a temperature reading. In response to collecting electrode signals, program 104 analyzes the signals and displays the analyzed signals on interface 208 for using viewing. For example, a user grabs and holds a door handle associated with locking mechanism 210. Program 104 collects electrode signals via the door handle, analyzes the electrode signals, and determines the heart rate of the user is 70 beats per minute and a temperature of 98.6 F. Program 104 then displays on interface 208 "Heart rate: 70 BPM" and "Body Temperature: 98.6 F.".

In yet another further embodiment, door 204 has connection terminals that allow for additional devices to be attached to door 204 and subsequently connected to the features of door 204 as well as network 120. In this embodiment, connection terminals include, but is not limited to, USB and Lightning ports. For example, a user can mount a palm pad onto door 204 that reads a palm-print or fingerprint of the user. The palm pad connects to door 204 and the features thereof via the connection terminals.

In one embodiment, door contacts 212 are mounted on an edge of door 212 and on door frame 202 respectively. Door contacts 212 are a set of terminals that establish a network connection for features of door 204 (i.e., camera 206, interface 208, locking mechanism 210, and battery 214) to network 120. In one embodiment, door contacts 212 are hardwire terminals that, when door 204 is in a closed state with door frame 202, form a physical closed circuit between the features of door 204 and network 120. In an alternate embodiment, door contacts 212 are a pair of near field transmitters and receivers that, when door 204 is in a closed state with door frame 202, form a closed circuit between the features of door 204 and network 120, wherein the closed circuit is the result of near field communication between the pair of near field transmitters and receivers of door contacts 212.

In an alternate embodiment, features of door 204 that require network connection to network 120 are connected to network 120 via wireless connection (i.e., wi-fi). In this embodiment, door contacts 212 are a set of terminals that establish a power supply connection for the features of door 204.

In one embodiment, battery 214 is mounted internally within the body of door 204. In other words, battery 214 is concealed from external cosmetic view. In this embodiment, battery 214 is a rechargeable battery that acts as a temporary power supply to the features of door 204 in the event of lost external power (e.g., when door 212 is an open state such that door contacts 212 form an open circuit or during a power outage of the building). Battery 214 is charged via door contacts 212 wherein door contacts 212 serve as a connection terminal to an external power source.

Figure 3:
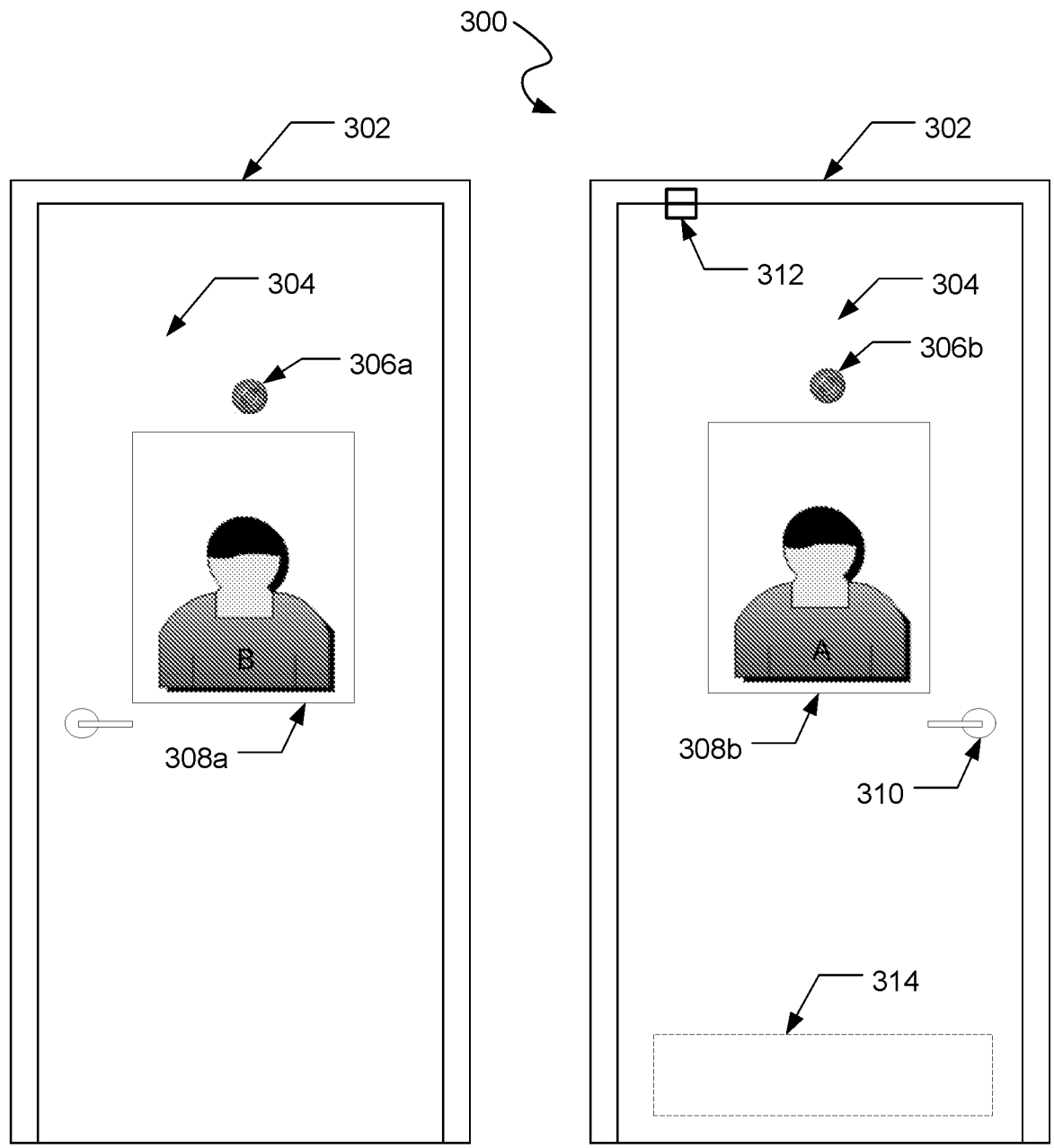
FIG. 3 is a two-way interface smart door, in accordance with an embodiment of the present invention.

FIG. 3 is an example embodiment 300 depicting front and back views of a two-way interface smart door, in accordance with an embodiment of the present invention. Example embodiment 300 is similar in form and function as example embodiment 200 of FIG. 2 apart from additional features that will be demonstrated below.

In this embodiment, door 304 utilizes two cameras and two interfaces, wherein a first camera is paired with a first interface, and a second camera is paired with a second interface. In FIG. 3, door 304 is mounted to fit correspondingly with door frame 302. Camera 306a is mounted on a front side of door 304, and likewise, camera 306b is mounted on a back side of door 304. Also, interface 308a is mounted on a front side of door 304, and interface 308b is mounted on a back side of door 304. The said configuration is such that, when person A is within the viewing range of camera 306a, program 104 collects video and audio signals from camera 306a and plays the collected video and audio signals on interface 308b. Conversely, when person B is within the viewing range of camera 306b, program 104 collects video and audio signals from camera 306b and plays the collected video and audio signals on interface 308a. The resulting configuration allows communication between person A and person B while maintaining a physical barrier (door 304) between them.

Locking mechanism 310, battery 314, and door contacts 312 of FIG. 3 are similar in form and function as locking mechanism 210, battery 214, and door contacts 212 of FIG. 2.

Figure 4:
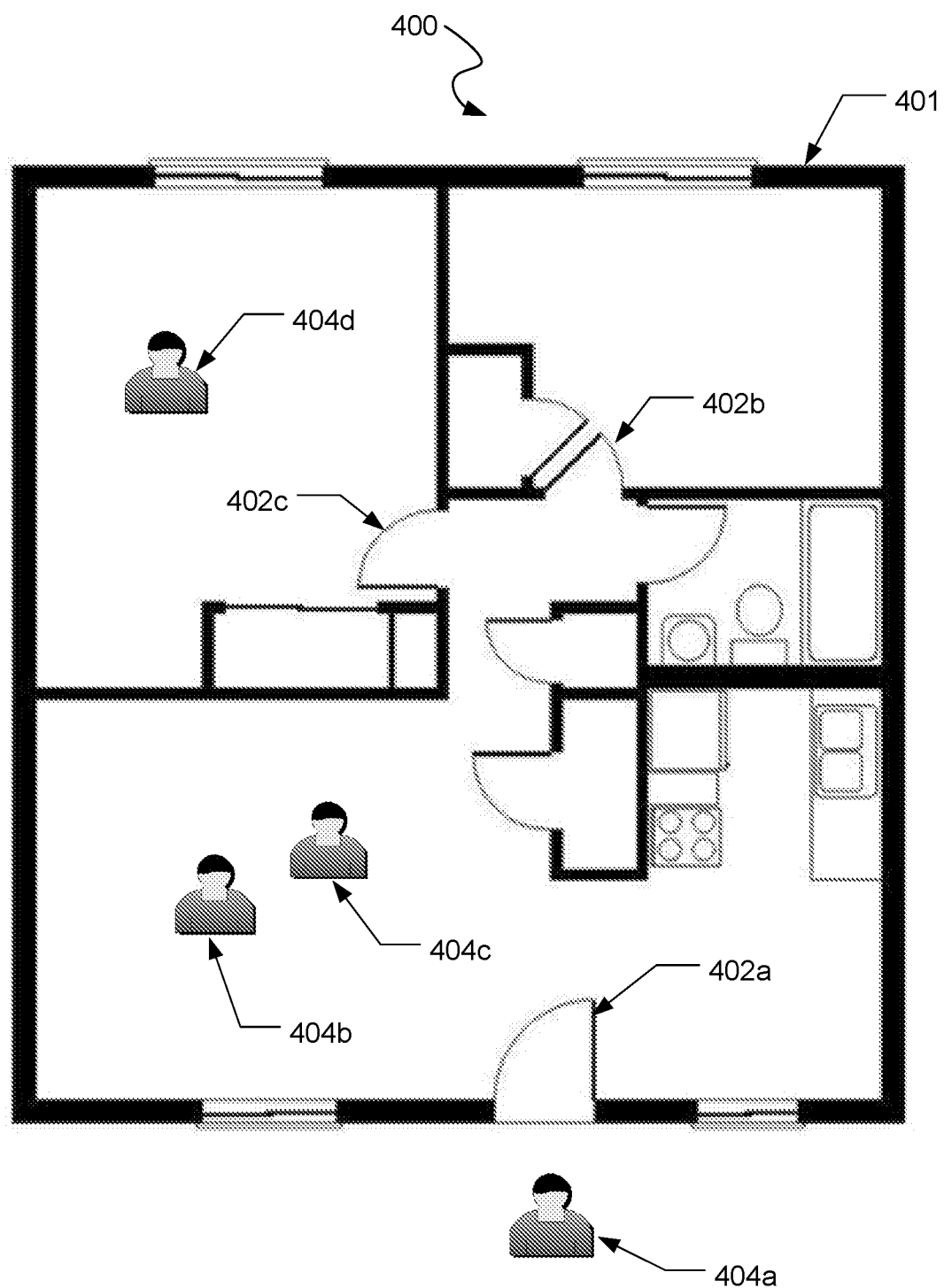
FIG. 4 is a network of smart doors used in a household, in accordance with an embodiment of the present invention

FIG. 4 is an example embodiment 400 depicting a network of smart doors used in a household, in accordance with an embodiment of the present invention.

In this embodiment, household 401 comprises doors 402a-c, wherein doors 402a-c are either embodiments of door 202 or door 302. Furthermore, person 404b and 404c occupy a living room of household 401; person 404d occupy a bedroom of household 401; and person 404a is outside household 401. Persons 404a-d are persons registered with program 104 (and subsequently have corresponding profiles stored on database 106) such that program 104 can identify persons 404a-d via facial recognition and/or RFID badge recognition based on the respective profiles of each person. Door 402a is a smart door that serves as a port of entry into household 401 from outside; door 402b is a smart door that serves as a door partition from a first bedroom and the living room of household 401; and door 402c is a smart door that serves as a door partition from a second bedroom and the living room of household 401. Doors 402a-c are connected and share data to each other via network 120. Furthermore, doors 402a-c have location data associated with each door that is stored on database 106, wherein the location data identifies the location of each door as well as surrounding context within household 401. For example, door 402a has location data that describes that door 402a is located at the entrance of household 401 and is a partition between the living room and outside of household 401.

In this embodiment, program 104 identifies locations of each person within household 401 based on cameras associated with doors 402a-c. For example, program 104 collects camera signals associated with door 402a, performs facial recognition analysis based on the camera signals, and identifies that person 404b and person 404c are in the vicinity of door 402a. Furthermore, program 104 determines that door 402a is located at the entrance of household 401 and is a partition between the living room and outside of household 401, based on the location data of door 402a. Program 104 then identifies locations of person 404b and 404c as being located in the living room of household 401 based on identifying the person 404b and person 404c are in the vicinity of door 402a and the determination that door 402a is located at the entrance of household 401 and is a partition for the living room of household 401.

Similarly, program 104 identifies that person 404d is located in the second bedroom of household 401 based on cameras associated with door 402c and the determination that door 402c is a door partitioning the second bedroom from the living room of household 401.

In a further embodiment, program 104 can display a graphical layout of household 401 and a set of graphical icons representing the identified locations of persons 404a-d (e.g., FIG. 4 showing a layout of household 401 and locations of persons 404a-d) on an interface of a device (e.g., corresponding interfaces of doors 402a-c, a smart television, a mobile device, or a personal computer). In a further embodiment, when a person leaves the household, program 104 displays on an interface of a device a graphical representation that the person has left the household. For example, person 404a has left household 401. Program 104 determines that person 404a was last identified, via cameras associated with door 402a, as passing from the living room to outside through door 402a. In response to determining that person 404a passed through door 402a to outside, program 104 displays a graphical icon representing person 404a as being externally located from household 401. In a further embodiment, program 104 can display a timestamp showing the last determined location of person 404a (i.e., the time at which person 404a left household 401 outside the camera range of door 402a). This embodiment allows for a user to track the locations of each person within a household, and to determine whether a person has exited the household.

In an even further embodiment, smart doors across a plurality of households are connected via network 120. In this embodiment, program 104 determines the locations of a person across the plurality of households having associated smart doors. Program 104 can then display a graphical representation of the person showing the location of the person. For example, person 404a leaves household 401 and enters a second household (not shown) that has a network of smart doors that are also connected to network 120. Program 104 determines that person 404a is located in a living room corresponding to the second household based on the network of smart doors associated with the second household. Furthermore, program 104 displays a graphical representation of a location of person 404a at the second household on an interface of a user device.

Figure 5:
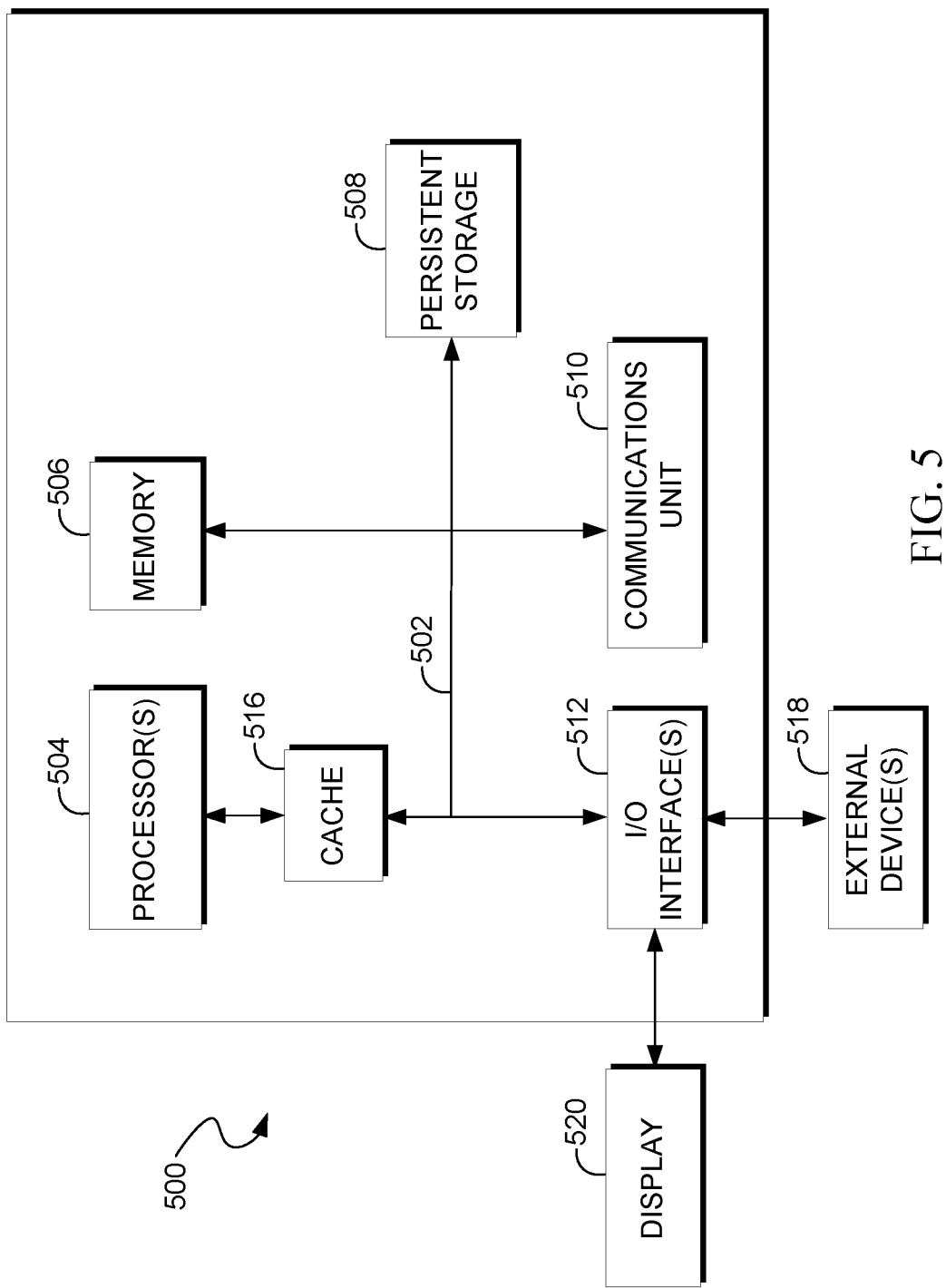
FIG. 5 depicts a block diagram of components of the computing system of FIG. 1, in accordance with an embodiment of the present invention.

FIG. 5 depicts a block diagram of components of computing systems within communication environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Program 104 may be stored in persistent storage 508 and in memory 506 for execution by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program 104 may be downloaded to persistent storage 508 through communications unit 510.

I/O interface(s) 512 allows for input and output of data with other devices that may be connected to server computer 102, player device 104, and/or collector device 106. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., program 104, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A smart door system, comprising:
   a first camera mounted directly within a first planar side of a first door;
   a first display interface mounted within a second planar side of the first door, wherein the first display interface displays video images of the first camera within a visual display of the first display interface, the first display interface being planarly flush with the second planar side of the first door and including a connection terminal for connections of alternate electronic devices with the first display interface;
   a locking mechanism coupled to the first door;
   a first door handle mounted on the second planar side of the first door adjacent the first display interface, the first planar side of the first door devoid of the door handle;
   a rechargeable battery mounted internally within the first door outside of the locking mechanism and the first door handle;
   a second camera mounted on a first planar side of a second door;
   a second display interface mounted on a second planar side of the second door, wherein the second display interface displays video images of the second camera within a visual display of the second display interface, wherein the first camera, the first display interface, the second camera, and the second display interface further comprising wireless technology that connect the first camera, the first display interface, the second camera, and the second display interface to a communication network; and
   a first computer processor in communication with the first display interface;
   a second computer processor in communication with the second display interface, each computer processor including distinct non-transitory computer readable storage media for the processing of program instructions to permit both display interfaces to collect and display signals between them via the communication network, the communication network permitting operative control of the smart door system through any of the first display interface and the second display interface; and
   the program instructions stored on each of the distinct one or more non-transitory computer readable storage media for execution with instructions to analyze the collected video images using facial recognition analysis so as to monitor and track locations of individuals within the communication network, the locations being displayed on any of the visual displays of the first and second display interfaces.

2. The smart door system of claim 1 further comprising a set of door contacts, wherein:
   a first door contact of the set of door contacts is mounted on an edge of the first door;
   a second door contact of the set of door contacts is mounted on a door frame of the first door; and
   the set of door contacts forming a closed circuit with the rechargeable battery and an external power supply when the first door is in a closed state.

3. The smart door system of claim 2, wherein the set of door contacts further comprising:
   forming a closed circuit with the first camera, the first display, and the communication network when the first door is in the closed state.

4. The smart door system of claim 1, further comprising:
   a third camera mounted on the second planar side of the first door; and
   a third display interface mounted on the first planar side of the first door, wherein the third display interface displays video images of the third camera.

5. The smart door system of claim 4, further comprising a set of door contacts, wherein:
   a first door contact of the set of door contacts is mounted on an edge of the first door;
   a second door contact of the set of door contacts is mounted on a door frame; and
   the set of door contacts forming a closed circuit with the rechargeable battery and an external power supply when the first door is in a closed state.

6. The smart door system of claim 5, wherein the set of door contacts further comprising:
   forming a closed circuit with the first camera, the third camera, the first display interface, the third display interface, and the communication network when the first door is in the closed state.

7. The smart door system of claim 1, wherein the door handle further comprising an electrode, wherein the electrode measures biometrics of a user.

8. The smart door system of claim 1, further comprising:
   a second door handle mounted on the first planar side of the first door.

9. The smart door system of claim 8, wherein the second door handle further comprising an electrode, wherein the electrode measures biometrics of a user.

10. The smart door system of claim 1, wherein the locking mechanism is an electromechanical lock, and wherein the locking mechanism is connected to the communication network.

* * * * *